(12) United States Patent
Zhan et al.

(10) Patent No.: US 8,560,110 B2
(45) Date of Patent: Oct. 15, 2013

(54) ELECTROEROSION CONTROL SYSTEM AND A DUAL MODE CONTROL SYSTEM

(75) Inventors: Yimin Zhan, Shanghai (CN); Renwei Yuan, Shanghai (CN); Garth M. Nelson, Ballston Lake, NY (US); Yuanfeng Luo, Shanghai (CN); Jun Cai, Beijing (CN); Ugo Cantelli, Florence (IT)

(73) Assignee: General Electric Company, Schenectady, NY (US)

(*) Notice: Subject to any disclaimer, the term of this patent is extended or adjusted under 35 U.S.C. 154(b) by 374 days.

(21) Appl. No.: 12/796,899

(22) Filed: Jun. 9, 2010

(65) Prior Publication Data

US 2010/0324720 A1    Dec. 23, 2010

Related U.S. Application Data

(60) Provisional application No. 61/218,497, filed on Jun. 19, 2009.

(51) Int. Cl.
  *G06F 19/00* (2011.01)
(52) U.S. Cl.
  USPC ............ 700/162; 700/160; 700/173; 700/174
(58) Field of Classification Search
  USPC .................... 700/159, 160, 162, 173–176
  See application file for complete search history.

(56) References Cited

U.S. PATENT DOCUMENTS

| | | | |
|---|---|---|---|
| 5,837,960 A * | 11/1998 | Lewis et al. | ............ 219/121.63 |
| 5,900,134 A | 5/1999 | Steneier et al. | |
| 6,264,822 B1 | 7/2001 | Wei et al. | |
| 6,403,910 B1 | 6/2002 | Stang et al. | |
| 6,416,283 B1 | 7/2002 | Johnson et al. | |
| 6,627,054 B2 | 9/2003 | Wei et al. | |
| 6,642,470 B2 | 11/2003 | Tricarico et al. | |
| 6,835,229 B2 | 12/2004 | Brown | |
| 6,846,227 B2 | 1/2005 | Sato et al. | |
| 6,858,125 B2 | 2/2005 | Wei et al. | |
| 6,897,400 B1 | 5/2005 | Yuan et al. | |
| 6,968,290 B2 | 11/2005 | Wei et al. | |
| 7,440,870 B2 * | 10/2008 | D'Angelo et al. | ............ 702/188 |
| 7,824,526 B2 | 11/2010 | Yuan et al. | |
| 2005/0218089 A1 | 10/2005 | Wei et al. | |
| 2005/0247569 A1 | 11/2005 | Lamphere et al. | |

(Continued)

OTHER PUBLICATIONS

Luo, Lin and Xi, Shaosheng: "Development of Composite Electric Spark Machining Center", Machine Tools, pp. 33-37, vol. 7, Jul. 31, 1992.

(Continued)

*Primary Examiner* — Mohammad Ali
*Assistant Examiner* — Nathan Laughlin
(74) *Attorney, Agent, or Firm* — Global Patent Operation

(57) ABSTRACT

An electroerosion control system includes a general CNC controller being configured for controlling a general CNC machine process, a power supply for energizing a tool electrode and a workpiece to be machined, an electroerosion controller electrically connecting with the power supply for controlling an output of the power supply, and adaptively and electrically connecting with the general CNC controller for communication thereof, and a sensor sensing real-time status information of a working gap between the tool electrode and the workpiece and for sending said real-time status information to said electroerosion controller. Said electroerosion controller automatically controls the electroerosion machining process through the general CNC controller according to the real-time status information of the working gap.

9 Claims, 9 Drawing Sheets

(56) References Cited

U.S. PATENT DOCUMENTS

| | | | |
|---|---|---|---|
| 2008/0021591 A1* | 1/2008 | Tani et al. | 700/178 |
| 2008/0135418 A1* | 6/2008 | Yuan | 205/686 |
| 2008/0173618 A1* | 7/2008 | Chen et al. | 219/69.17 |

OTHER PUBLICATIONS

CN Office Action dated Feb. 24, 2010 from corresponding CN Application No. 200710301565.3, along with unofficial English translation.

* cited by examiner

ELECTROEROSION CONTROL SYSTEM AND A DUAL MODE CONTROL SYSTEM

This application claims benefit of U.S. Provisional Patent Application No. 61/218,497 titled "MACHINING CONTROL SYSTEM", filed Jun. 19, 2009. The disclosure of the Provisional Application is hereby incorporated by reference in its entirety.

BACKGROUND

The present invention generally relates to machining control systems and more specifically relates to an electroerosion machining control system modified from an N/C machining control system.

Electroerosion machining is a non-traditional machining technique that uses electrical current to remove material from a workpiece, including Electro-Chemical Machining (ECM), ElectroDischarging Machining (EDM), Electro-Chemical Discharge Machining (ECDM), for example. In EDM, a DC voltage is applied to an electrode and the workpiece, and the workpiece is eroded by a spark formed in a gap between the electrode and the workpiece. A dielectric liquid is usually forced into the gap between the electrode and the workpiece. In ECM, an electrode is placed in proximity to the workpiece and an electric potential is placed across the drill electrode and the workpiece. Electrolyte is forced into the gap between the electrode and the workpiece, and work material is removed by electro-chemical action. The ECDM process is partly spark erosion and partly electro-chemical.

Commercially available electroerosion machines include control systems for controlling the electroerosion machining process. Such a control system is generally embedded in the machine that cannot be modified or re-developed for operators or customers.

BRIEF DESCRIPTION

An aspect of the invention resides in an electroerosion control system for controlling an electroerosion machining process. The electroerosion control system includes a general CNC controller being configured for controlling a general CNC machine process, a power supply for energizing a tool electrode and a workpiece to be machined, an electroerosion controller electrically connecting with the power supply for controlling an output of the power supply, and adaptively and electrically connecting with the general CNC controller for communication thereof, and a sensor sensing real-time status information of a working gap between the tool electrode and the workpiece and for sending said real-time status information to said electroerosion controller. Said electroerosion controller automatically controls the electroerosion machining process through the general CNC controller according to the real-time status information of the working gap.

Another aspect of the invention resides in a dual mode control system. The dual control system comprises an electroerosion controller storing an electroerosion software, and a CNC controller electrically communicating with the electroerosion controller. The CNC controller stores a NC part program and includes a first general CNC mode and a second electroerosion mode. In the first general CNC mode, the CNC controller controls a general CNC machine to perform general CNC machining; and in the second electroerosion mode, the electroerosion controller performs the electroerosion software and sends electroerosion instructions through the general CNC controller to control the general CNC machine to perform electroerosion machining.

DRAWINGS

These and other features, aspects, and advantages of the present invention will become better understood when the following detailed description is read with reference to the accompanying drawings in which like characters represent like parts throughout the drawings, wherein:

FIG. 1 schematically shows a general CNC machine for performing automatic machining.

FIG. 2 shows a block diagram of an exemplary CNC control system of the general NC machine in FIG. 1.

FIG. 3 schematically shows an electroerosion machine modified from the CNC machine in FIG. 1 according to certain embodiments of the invention, the electroerosion machine is performing machining of a workpiece.

FIG. 4 schematically shows an electroerosion spindle assembly mounted on a spindle of the CNC machine.

FIG. 5 schematically shows a cross-sectional view of the electroerosion spindle assembly performing electroerosion machining of the workpiece.

DETAILED DESCRIPTION

Numerically-Controlled ("NC") and Computerized Numerical Control ("CNC") machines are commonly used for providing traditional automated machining. Both types of machines have machine tools and control systems for controlling the machine tools to perform automatic machining operation. The operations, such as feedrate, axes positions, spindle speed of the machine tool, and so forth, are effected by a sequence of pre-programmed instructions of the control system. The pre-programmed instructions are contained in a storage medium operatively interconnected with the machine tool. "Numeral Control" (N/C), hereinafter, refers to all automated machining methods, including NC machining, CNC machining and the like.

"Electroerosion machining" refers to electro-machining processes that use electrical current to remove material from a workpiece and circulate a cutting fluid in a working gap between the electrode and the workpiece, such as ECM, EDM, ECDM and the like.

Figure 1:
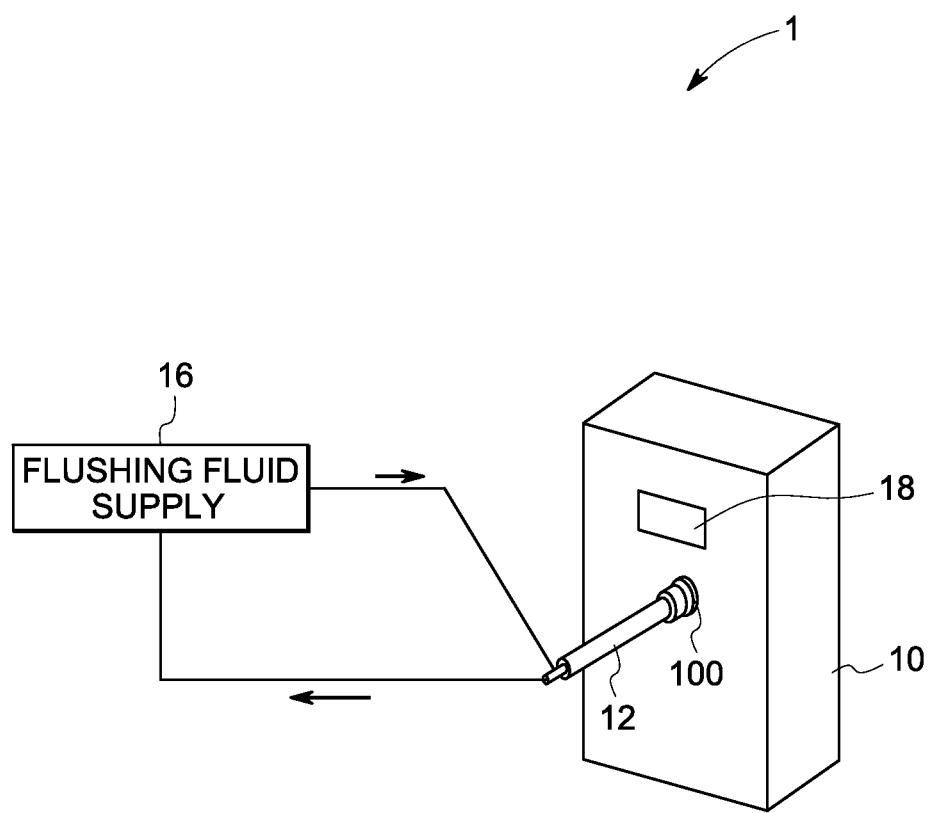
Figure 2:
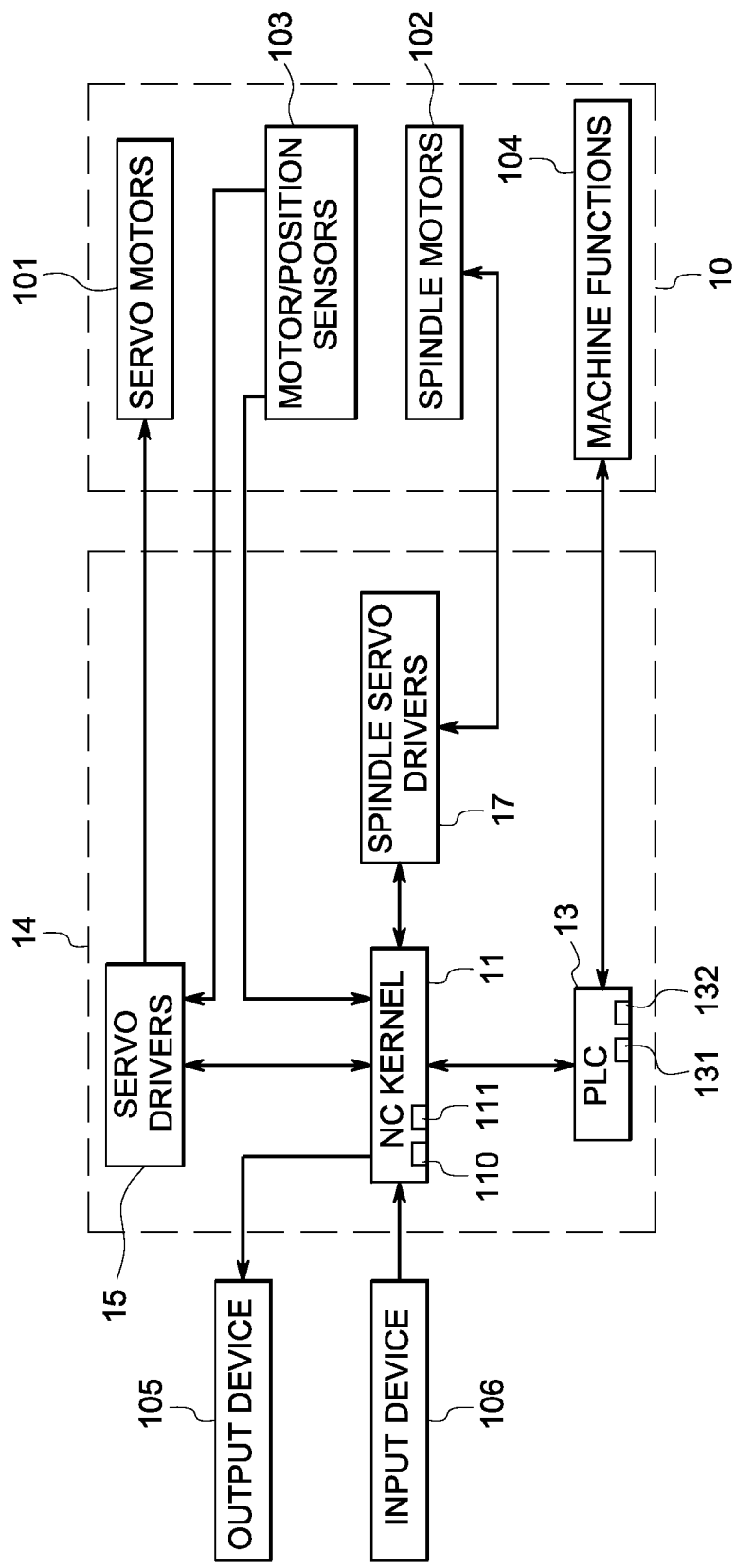

An exemplary general CNC machine 1 for performing automated machining is schematically shown in FIG. 1. The invention is also applicable to general NC machines and other N/C machines with proper modifications from the embodiments illustrated below. The CNC machine 1 includes a machine tool 10, a cutter 12 supported by the machine tool 10 for performing CNC machining operation, an CNC controller 14 (as shown in FIG. 2) mounted in the machine tool 10 for controlling the machining process, and a flushing fluid supply 16 for providing flushing fluid for the cutter 12 during machining. The machine tool 10 has an operating panel 18 connecting with the controller 14 for manual operation of the CNC machine 1. The exemplary general CNC machine 1 shown in FIG. 1 is a CNC milling machine, and the cutter 12 is a rotatable milling cutter. The machine tool 10 is provided with a rotatable spindle 100. The milling cutter 12 is detachably mounted on the spindle 100 and rotates together with the spindle 100.

FIG. 2 shows a block diagram of the CNC controller 14 and a CNC control system utilizing the CNC controller 14 for controlling the CNC milling process. The CNC controller 14 generally includes an NC kernel 11, a Programmable Logic Control (PLC) (or Programmable Machine Control (PMC) 13, servo drivers 15, and spindle servo drivers 17. The NC kernel 11 is the central part of the CNC controller 14, and generally includes a central processing unit ("CPU") serving as a calculation and control device, a read only memory ("ROM") in which a CNC part program is stored, and a random access memory ("RAM").

A workpiece (not shown) is machined to a desired shape by moving the workpiece and the machine tool 10 three-dimensionally in accordance with the CNC part program in the NC kernel 11. The machine tool 10 has servo motors 101 and spindle motors 102. The servo motors 101 drive the machine tool 10 and the workpiece to move at a desired speed and path, and the spindle motors 102 drive the spindle 100 to rotate at a desired speed. The NC kernel 11 controls the positions and the speeds between the workpiece and the machine tool 10 through the servo motors 101 and according to the NC part program. The CPU of the NC kernel 11 analyzes the CNC part program, then generates moving command pulses indicating the command positions on respective moving axes, and then drives the machine tool 10. Normally, before being sent to the servo motors 101 the command pulses generated by the NC kernel 11 are sent to servo drivers 15 for amplification and modulation purposes.

In certain embodiments, the NC kernel 11 also controls movements/operations of the spindle 100 through the spindle motors 102, for controlling spindle speed of the milling cutter 12. Instructions from the NC kernel 11 are amplified and modulated by the spindle servo drivers 17. In an alternate embodiment, which is not shown on the drawing figures, the PLC 13, instead of the NC kernel 11, is connected to the spindle servo drivers 17 to drive and control the spindle motors 102. The PLC 13 outputs control commands to start and stop the spindle motors 102 and control its speed through the spindle servo drivers 17.

In one embodiment, the NC kernel 11 is provided with Input/Output (I/O) ports 110 and communication ports 111 such as RS-232 serial ports, Ethernet, USB and the like, which are generally used for communicating with other electronic devices, such as a computer.

In certain embodiments, the general CNC control system is a closed-loop control system. A plurality of motor/position sensors 103 are mounted on the servo motors 101. The motor/position sensors 103 detect and send real-time status of the servo motors 101 to the CNC controller 14. For example, the motor/position sensors 103 detect and send real-time position information of the machine tool 10 to the NC kernel 11 and send real-time current and speed information of the servo motors 101 to the servo drivers 15, and thus the NC kernel 11 and the servo drivers 15 can timely adjust and control the machining process accordingly.

The PLC 13 is connected to the NC kernel 11 and performs various kinds of machine functions 104 of the machining, such as tool-change control, control of the rotation speed of the spindle 100, workpiece-change controls, coolant on/off control and the like. The PLC 13 includes a microprocessor and a memory that stores a ladder program.

The PLC 13 is provided with analog I/O modules 131 and digital I/O modules 132 with I/O connection terminals for the operators to make some modification or expansion to the ladder program.

The CNC machine 1 may be provided with an input device 106 for downloading programs to the CNC controller 14, and an output device 105 for outputting signals to a computer or other monitoring devices (not shown).

Figure 3:
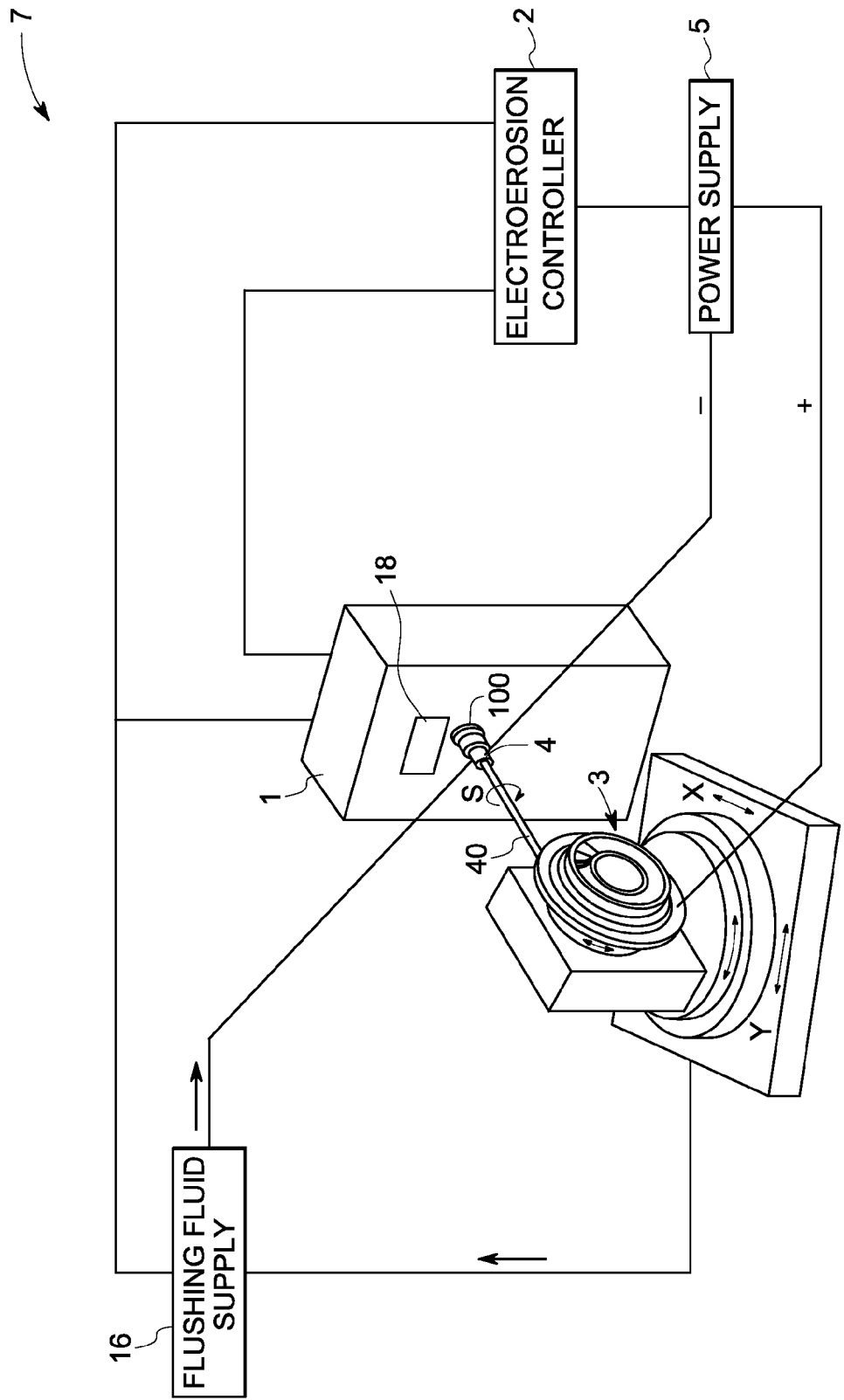

FIG. 3 schematically illustrates an electroerosion machine 7 that is performing electroerosion machining of a workpiece 3. As an exemplary embodiment, the electroerosion machine 7 is an ECDM machine. The invention is also applicable to other electroerosion machines with proper modifications from the exemplary embodiments illustrated below. The ECDM machine 7 is modified from the CNC milling machine 1 by providing an ECDM controller 2 electrically communicating with the CNC control system of the CNC milling machine 1, an adaptive ECDM spindle assembly 4 having a tool electrode 40 for performing ECDM operation, and a power supply 5 for carrying electrical power through the tool electrode 40 of the ECDM spindle assembly 4 and the workpiece 3. The ECDM controller 2 stores an ECDM software for ECDM process control.

Figure 6:
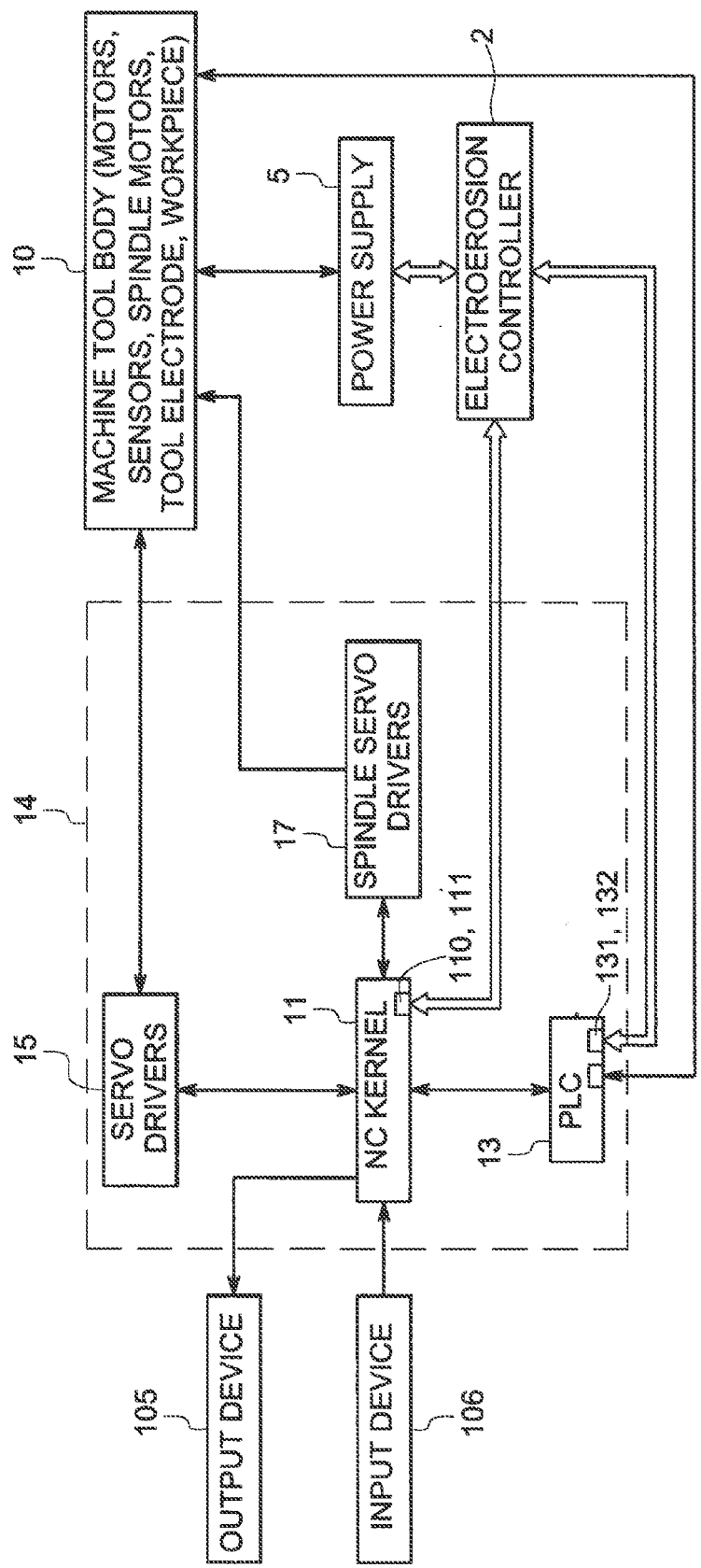
FIG. 6 is a block diagram of a dual mode control system for the electroerosion machine in FIG. 3, the dual mode control system is modified from the CNC control system in FIG. 2.

The power supply 5 sends DC power to the electrode 40 and the workpiece 3. The power supply 5 includes suitable electrical leads, correspondingly joined to the tool electrode 40 as a cathode (−) and the workpiece 3 as an anode (+) in the present embodiment. In other embodiments, the polarities can be changed. The tool electrode 40 is made from suitable material, for example but not limited to graphite, and performs ECDM operation. In certain embodiments, the electrode 40 is tubular in cross-section. The flushing fluid supply 16 provides cutting fluid flowing through a working gap 6 between the tool electrode 40 and the workpiece 3 (as shown in FIG. 6).

Figure 4:
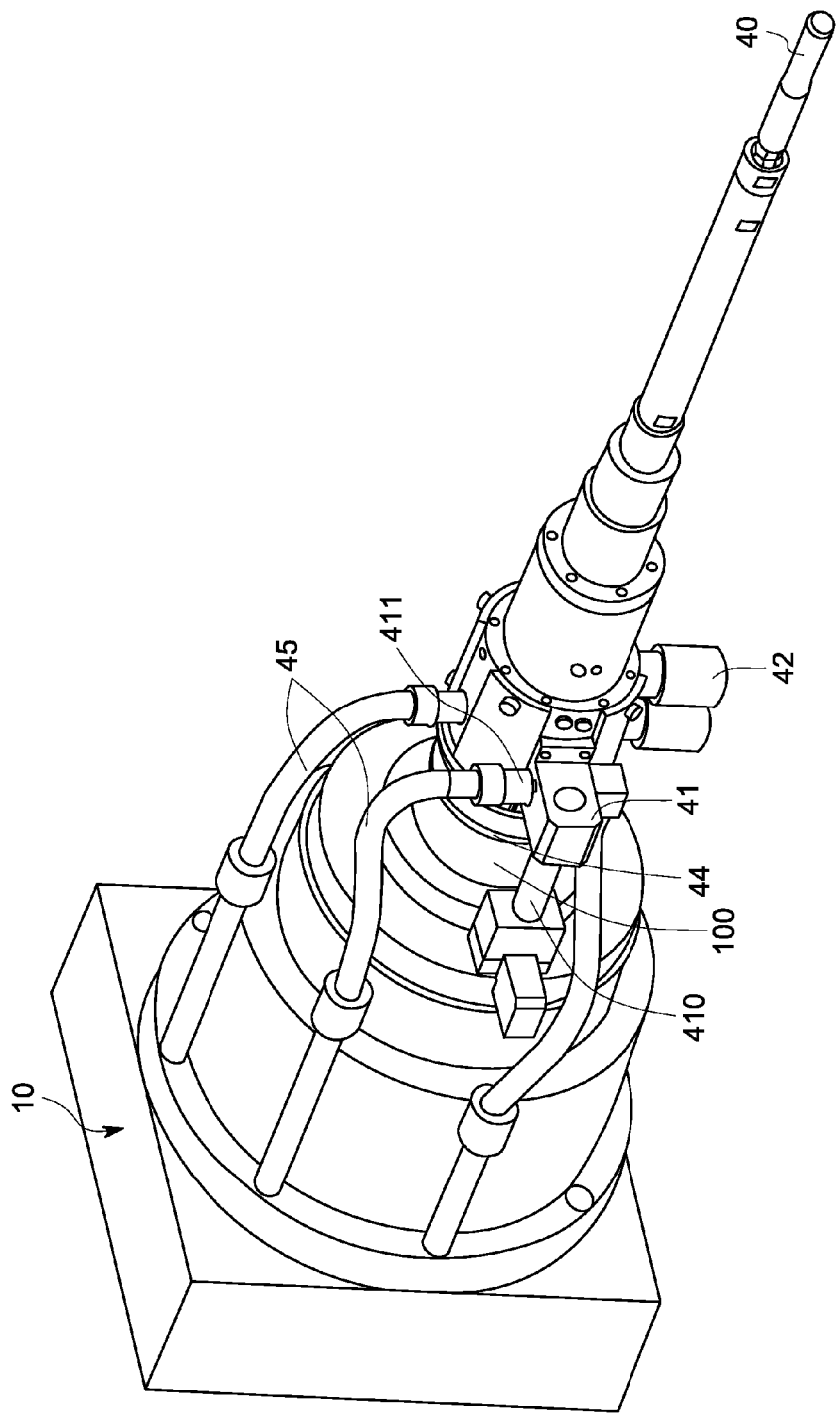

The milling cutter 12 of the general CNC milling machine 1, for performing general CNC milling machining, is replaced with the ECDM spindle assembly 4. As shown in FIG. 4, the exemplary ECDM spindle assembly 4 includes a block 41 with a securing rod 410 secured to the CNC machine tool 10. Several power connectors 42 are mounted on the spindle assembly 4 joined with the electrical leads for inducing electricity from the power supply 5, and a stationary-to-rotary electrical conduction device 43 is provided for transmitting the power energy from the power connectors 42 to the rotating tool electrode 40. An insulating layer 44 is provided between the tool electrode 40 and the spindle 100 for insulation purpose. A plurality of conduits 45 are provided for transmitting flushing fluid from the flushing fluid supply 16 to ECDM spindle assembly 4.

Figure 5:
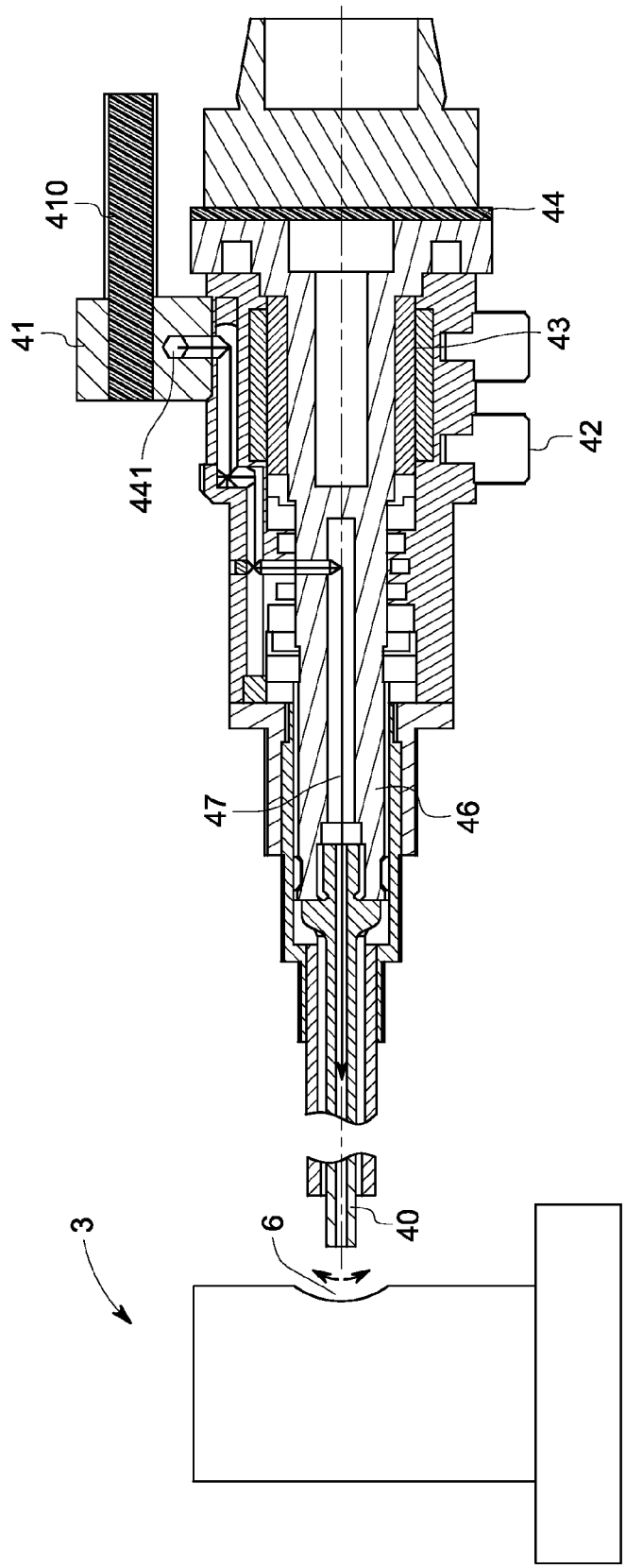

As shown in FIGS. 4 and 5, the ECDM spindle assembly 4 includes a main shaft 46 that has a rear end rotatably secured with the spindle 100 of the general CNC machine 1. The tool electrode 40 is rotatably secured to a front end of the main shaft 46. In one exemplary embodiment, the stationary-to-rotary electrical conduction device 43 employs a plurality of carbon brushes that electrically connect with the main shaft 46, such that the electrical power is transmitted from the power supply 5 (shown in FIG. 3), through the power connector 42, the carbon brushes 43, the main shaft 46, to the tool electrode 40. The ECDM spindle assembly 4 is provided with at least one flushing channel 47 shown as the dashes lines in FIG. 5. In certain embodiments, the block 41 provides inlets 411 for the flushing channel 47, and thus flushing fluid from the flushing fluid supply 16 flows through the conduits 45, the inlets 411, the flushing channel 47, to the working gap 6 between the electrode 40 and the workpiece 3.

Sensors are provided for monitoring and sampling real-time status of the working gap 6 between the electrode 40 and the workpiece 3. In one exemplary embodiment, the power supply 5 has a voltage or current measurement circuit that is not shown in the drawing figures, for measuring the real-time voltage or current information of the working gap 6 and sends the real-time voltage or current information to the ECDM controller 2, the ECDM controller 2 then generates real-time controlling reference accordingly. The ECDM controller 2 controls the machining process according to this real-time controlling reference. Circuits in the power supply 5 may also include, without limitation, a microprocessor or another computational device, a timing device, a pulse generation device, a voltage comparison device, and a data storage device, among others. All such devices are well known in the art, and any such suitable device may be used without deviating from the scope of the invention.

A dual mode control system is shown in FIG. 6, wherein the servo motors 101, motor/position sensors 103, spindle motors 143, the tool electrode 40, and the workpiece 3 are combined to be shown together as the machine tool 10 for a simplified illustration. The dual mode control system is modified from the CNC control system in FIG. 3 by providing the ECDM controller 2 and the power supply 5. The ECDM controller 2 electrically connects with the power supply 5 for controlling the output of the power supply 5 transmitted to the tool electrode 40 and the workpiece 3. The ECDM controller 2 also connects with the I/O port 110 and communication ports 111 of the NC kernel 11 and I/O ports 131, 132 of the PLC 13 of the CNC controller 14 for communication thereof. The ECDM controller 2 sends ECDM controlling commands, such as contact sensing, feedrate override modification, jump up/down, spindle speed override modification, and the like to the NC kernel 11 and the PLC 13 of the CNC controller 14.

Figure 7:
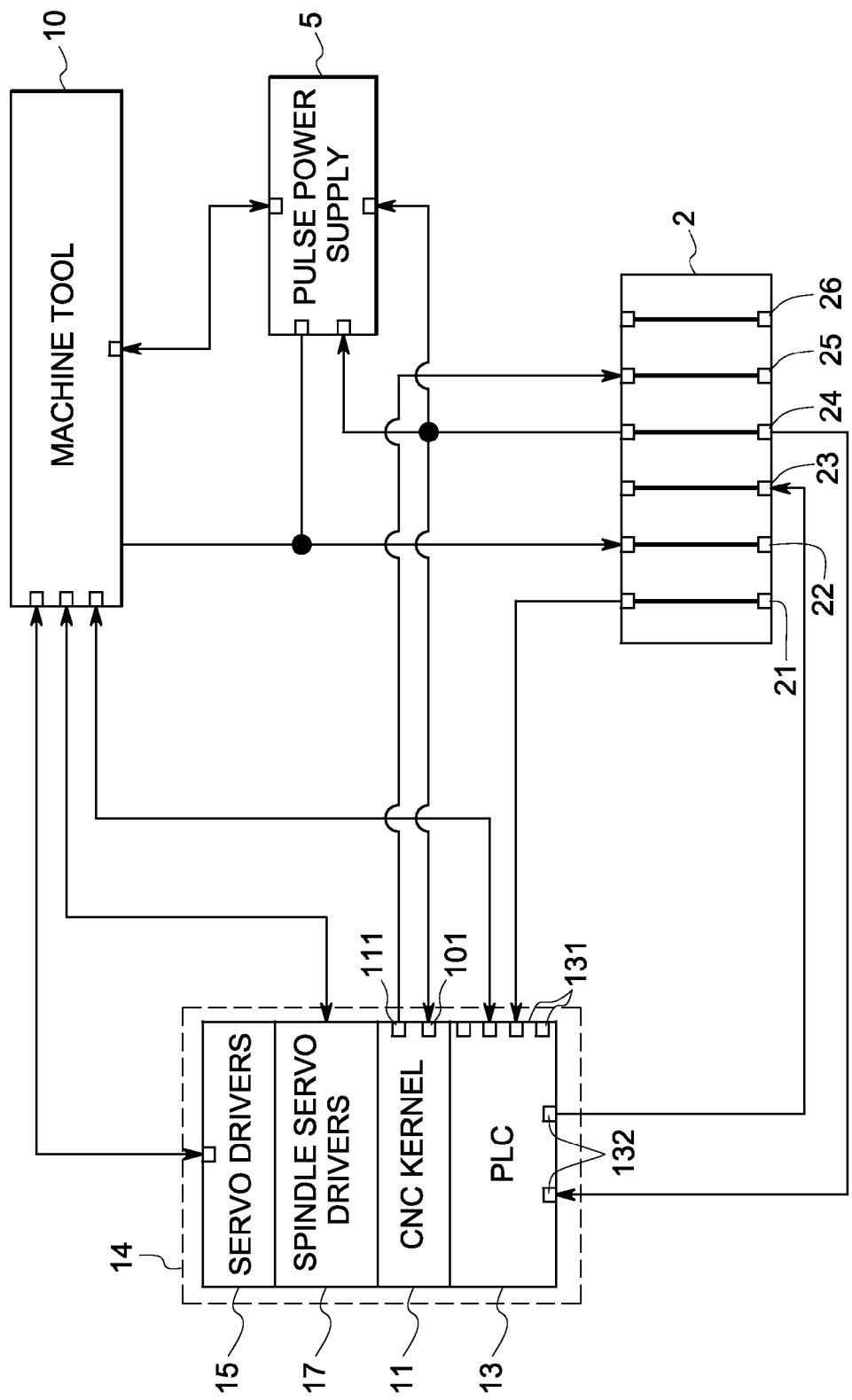
FIG. 7 illustrates a hardware connection of the electroerosion control system of FIG. 6, utilizing a CompactRIO (cRIO) according to one exemplary embodiment of the invention.

In certain embodiments, the ECDM controller 2 is a stand-alone controller. FIG. 7 shows an exemplary hardware connection of the dual mode control system, wherein a commercially available CompactRIO (cRIO) is utilized as the ECDM controller 2. The cRIO 2 combines an embedded real-time processor, a high-performance Field Programmable Gate Array (FPGA), and hot-swappable I/O modules. Each I/O module is connected directly to the FPGA, providing low-level customization of timing and I/O signal processing. The FPGA is connected to the embedded real-time processor via a high-speed PCI bus or the like. This represents a low-cost architecture with open access to low-level hardware resources. The cRIO is equipped with built-in data transfer mechanisms to pass data from the I/O modules to the FPGA and also from the FPGA to the embedded processor for real-time analysis, post processing, data logging, or communication to a networked host computer.

As shown in FIG. 7, the exemplary cRIO 2 includes an analog output (AO) module 21, an analog input (AI) module 22, a digital input (DI) module 23, a digital output (DO) module 24, a real-time (RT) controller module 25, and a FPGA 26. The AO, AI, DI, DO modules 21-24 has connection terminals for communicating with the CNC controller 14 or the power supply 5. The RT controller module 25 has connection terminals communicating with the CNC controller 14 or the power supply 5. The FPGA 26 is the main processing portion of the cRIO 2 for converting the real-time voltage or current information of the working gap 6 into real-time controlling reference. The cRIO 2 includes internal wiring buses (not shown) for internal communicating between the modules 21-25.

The AI module 22 of the cRIO 2 has terminals that electrically connect with the power supply 5, so as to receive the real-time voltage or current information of the working gap 6 from the power supply 5. The voltage or current information is transmitted to the FPGA 26 through the internal wiring buses for processing. The AI module 22 may also has some terminals for connecting with sensors on the machine tool 10 for receiving real-time status information of the flushing fluid supply 16, such as such as conductivity, temperature, pressure etc.

The AO module 21 of the cRIO 2 has terminals electrically connected with the analog input 131 of the PLC 13 for automatic feedrate override modification from 0 to 100%, 200% or 254%, depending on maximum feedrate of ECDM process. The CNC part program in NC kernel 11 has a preset feedrate value F, that is a reference feedrate. During an ECDM process, if the maximum override is set to 100%, and the maximum analog output from the AO module 21 is 10 volt, then the override FO and the real-time controlling reference V has the relationship of:

$$FO=(100\%/10)*V,$$

Thus the real-time feedrate F' is as:

$$F'=(100\%/10)*V*F.$$

The cRIO 2 then automatically modifies the feedrate override.

While the CNC milling machine 1 is performing CNC milling machining, the feedrate override can be adjusted by a Manual Feedrate Override (MFO) rotary switch on the operating panel 18.

The DI module 23 of the cRIO 2 electrically connects with the digital output 132 of the PLC 13, so as to receive some sequence control instructions from the PLC 13, such as parameter transfer mode, cutting mode, tool touch mode, power supply 5 on/off and the like.

The DO module 24 of the cRIO 2 has terminals connecting with communication port 111 of the NC kernel 11 for contact sensing control of the ECDM process. Contact sensing refers to that, in non-memory mode or non-auto motion of an electroerosion machining process, in case of the electrode contacts with the workpiece, machine tool stops immediately, so that no damage arises to the electrode and the workpiece. Contact sensing also refers to that, during positioning line midpoint or circle center and measuring tool length, the machine tool stops immediately when the electrode touches the workpiece. In the exemplary embodiment, while the tool electrode 40 is not performing ECDM operation, the tool electrode 40 contacts with the workpiece 3, for example but not limited to for positioning line midpoint purpose, the cRIO sends a contact sensing trigger signal through terminals of the DO module 24 to the communication input 111 of the NC kernel 11. The NC kernel 11 passes such a contact sensing trigger signal to the PLC 13, thus the PLC 13 sends a stop instruction to the machine tool 10. The tool electrode 40 then stops and retracts a certain distance. Ladder program of the PLC 13 is modified so as to receive and response to the contact sensing trigger from the NC kernel 11.

The DO module 24 of the cRIO 2 has terminals connecting with digital input 132 of the PLC 13 for jump/up down control during the ECDM process. "Jump UP/Down" refers to that, the tool electrode 40 jump up and restore rapidly when short circuit arises between the tool electrode 40 and the workpiece 3, for a failsafe purpose. Traditional CNC machines 1 are generally provided with a "Tool Retraction and Recovery," (TRR) function, that is to jump the cutter 12 a distance away from the workpiece for checking status of the cutter 12 and the workpiece, then restore back to restart the machining. The TRR function in FANUNC CNC machines are stored in the PLC 13, and the jump distance is preset either by the part program with block "G10.6 xxx" or by parameters in NC kernel 11. While for SIEMENS Sinumerik series CNC machines, this function can be implemented by Asynchronous Interrupt Subroutines (ASUBs) or motion Synchronous Actions. In certain embodiments of the invention, during ECDM process, when the a short circuit occurs in the working gap 6, the FPGA 26 calculates a real-time ECDM control reference according to the real-time voltage/current information of the working gap 6 senses by the power supply 5, then a Jump Up/Down instruction is transmitted from the DO module 24 to the PLC 13. The PLC 13 sends such a Jump Up/Down instruction to the NC kernel 101 and triggers the TRR function. The tool electrode 40 then jumps a preset distance, and restore after a short time.

The RT control module 25 of the cRIO2 includes terminals connecting with the RS 232 serial ports 111 of the NC kernel 11 for receiving preset power supply parameters in the part program in the NC kernel 11, such as current, voltage and the like. The DO module 24 of the cRIO 2 has terminals connecting with the power supply 5 for sending power supply parameters to the power supply 5.

The modified machine tool 1 is a dual mode machine that includes a first general CNC mode and a second ECDM mode. On the CNC mode, the CNC machine is controlled by the CNC controller 14 to perform general CNC machining. On the ECDM mode, the cRIO 2 and the CNC controller 14 together control the NC machine 1 to perform ECDM operation. Both the NC part program in the NC kernel 11 and the ladder program in the PLC 13 are modified to include the first CNC mode and the second ECDM mode.

Figure 8:
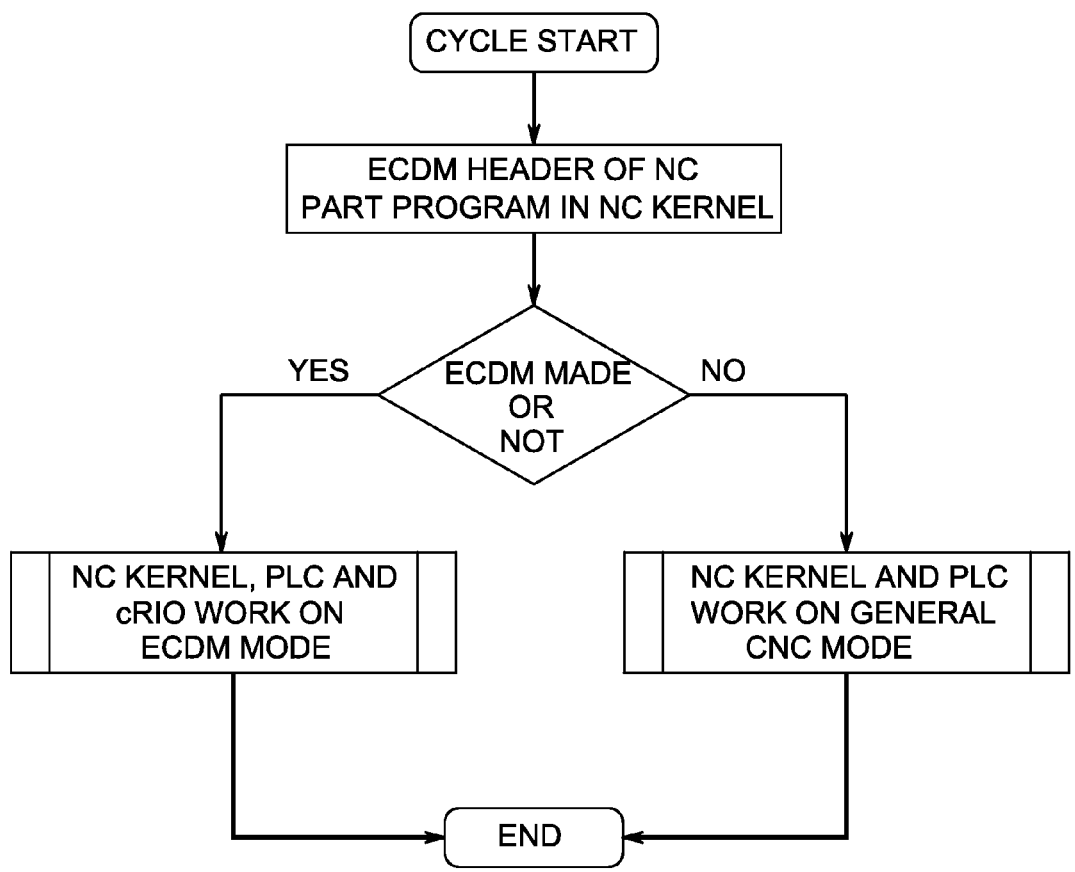
FIG. 8 shows a flow chart of the dual mode control system of FIG. 6.

A flowchart of the modified machining program is illustrated in FIG. 8. When the machine 1 is turned on, it decides whether to perform in the first general CNC mode or in the second ECDM mode. This can be realized by software or manual control on the operating panel 18. If it is in the general CNC mode, the ECDM in the cRIO 2 is skipped, and the PLC 13 and the NC kernel 11 are in the first general CNC mode and perform general CNC milling machining. If it is in the ECDM mode, the PLC 13 and the NC kernel 11 are in the second ECDM mode. The PLC 13 sends machining instruction to the cRIO 2 through the DI 23, and thus the cRIO 2 performs ECDM control according to the ECDM software.

Figure 9:
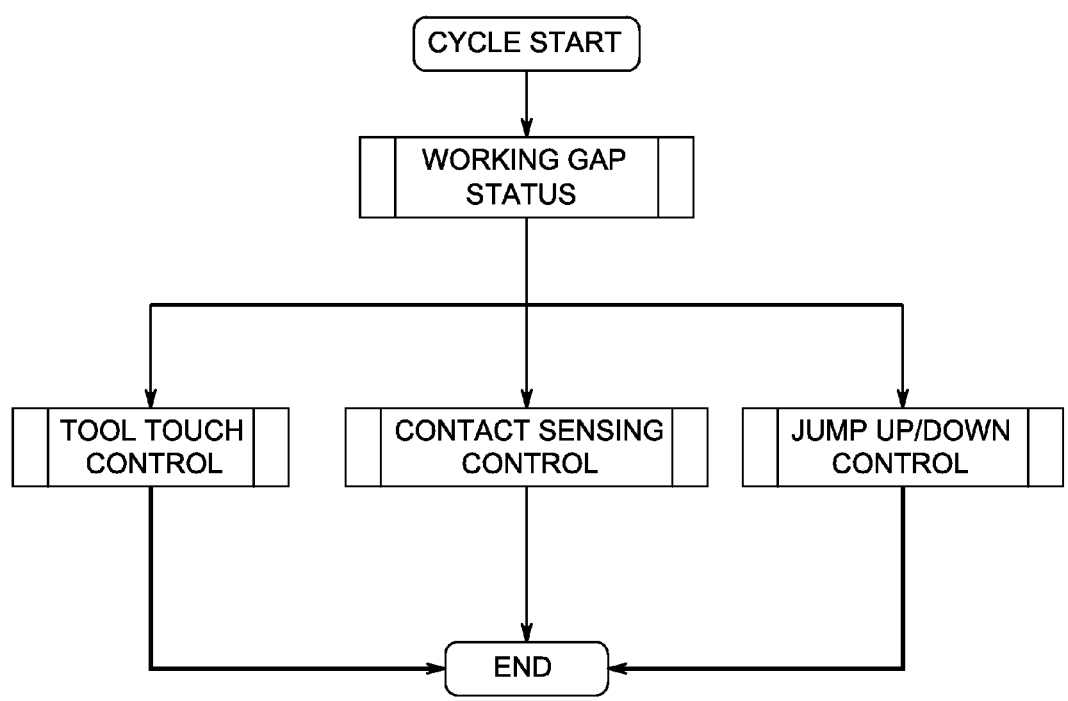
FIG. 9 shows a flow chart of an ECDM software in the cRIO.

A flowchart of the ECDM software is illustrated in FIG. 9. Once the machine tool 10 is started and works in the second ECDM mode, the cRIO 2 receives real-time voltage or current of the working gap 6 from the power supply 5, generates real-time ECDM controlling reference by the FPGA 26 and then performs ECDM control accordingly, for contact sensing, feedrate override modification, jump up/down and the like.

In certain embodiments, a human machine interface (HMI) by Ethernet (PC or Touch Screen) is provide for sending parameters, such as ON/OFF duration, IP and the like to the PPS, and feedrate override to the machine tool 1, as well as display important parameters (e.g. actual feedrate override, normal/short/open discharge ratio of the power supply) and gap voltage waveform & pulses mid-point waveform.

In other embodiments, the ECDM controller can be a printed circuit board with proper arrangement of the electronic components and wire connections.

In still another embodiment, the ECDM controller 2 can be a computer. A wiring board is mounted in I/O buses of the computer, and the computer communicates with the CNC controller 14 through specialized fiber cables or I/O ports or Ethernet.

The electroerosion machine as illustrated in FIG. 3, that is modified from the general CNC machine 1 of FIG. 1, can be used for a hybrid machining process including both an electroerosion machining process and a general CNC machining process. An exemplary hybrid machining process may be used for producing holes in an impeller (not shown). First, the machine performs an ECDM machining process for a rough machining of the impeller. The machine is typically equipped with the ECDM spindle assembly 4 with the tool electrode 40, made from, for example, but not limited to copper. The NC kernel 11 and PLC 13 of the CNC controller 14 and the ECDM controller 2 all work in the ECDM mode. As discussed, this can be performed either by the NC part program in the NC kernel 11 of the CNC controller 14 or by the operating panel 18. The power supply 5 receives controlling commands from the ECDM controller 2 and sends electrical current to the tool electrode 40 and the impeller, respectively as a cathode and an anode. The ECDM controller 2 receives real-time status information of the working gap 6 and then controls the ECDM process by sending commands to the CNC controller 14. The CNC controller 14 controls movement of the tool machine 14, the impeller, and the spindle 100, through the servo motors 101 and the spindle motor 102, according to the NC part program stored in the NC kernel 11.

A general CNC milling machining is performed after the ECDM machining process, for a fine machining the hole in the impeller. The ECDM spindle assembly is detached from the machine tool 10, and the CNC milling cutter 12, that is made from, for example, High speed steel, carbide steel, materials with diamond or CBN coating and the like, is assembled to the spindle 100. ECDM software in the ECDM controller 2 is skipped, and the power supply 5 is not actuated to work. The NC kernel 11 and PLC 13 of the CNC controller 14 both work in the general CNC mode. The CNC controller 14 controls movement of the machine tool 10, the impeller, and the spindle 100, through the servo motors 101 and the spindle motor 102, according to the NC part program stored in the NC kernel 11. Other general machining functions are controlled by the PLC 13 according to the ladder program therein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electroerosion control system, comprising:
 a general Computerized Numerical Controller (CNC) controller being configured for controlling a general CNC machine process, wherein the general CNC controller includes an Numerically-Controlled (NC) kernel and a Programmable Logic Control (PLC), the NC kernel stores a NC part program and the PLC stores a ladder program;
 a power supply for energizing a tool electrode and a workpiece to be machined, wherein the power supply includes a voltage measurement circuit for sensing real-time voltage of a working gap;
 an electroerosion controller electrically connecting with the power supply for controlling an output of the power supply, and adaptively and electrically connecting with the general CNC controller for communication thereof, wherein the electroerosion controller performing electroerosion control according the real-time voltage of the working gap; and a sensor sensing real-time status information of the working gap between the tool electrode and the workpiece and for sending the real-time status information to the electroerosion controller, the electroerosion controller automatically controlling the electroerosion machining process through the general CNC controller according to the real-time status information of the working gap, wherein the general CNC controller includes a Tool Retraction and Recovery (TRR) motion and the electroerosion controller sends jump up/down signal according to the real-time status information of the working gap to the general CNC controller to trigger the TRR motion, wherein a jump distance of the jump up/down action is written either in the NC part program or a parameters table of the NC kernel; and wherein the electroerosion controller sends a jump up/down signal to the PLC of the general CNC controller, the PLC transmitting the jump up/down signal to the NC kernel where the NC part program is stored.

2. The electroerosion control system according to claim 1, wherein the electroerosion controller includes a Field Programmable Gate Array (FPGA) for converting real-time voltage of the working gap into electroerosion control reference.

3. The electroerosion control system according to claim 1, wherein the electroerosion controller sends automatic feedrate override modification to the CNC controller according to the real-time status information of the working gap.

4. The electroerosion control system according to claim 1, wherein the electroerosion controller sends contact sensing trigger to the CNC controller to stop the tool electrode and retract a certain distance, when the tool electrode touches the workpiece.

5. The electroerosion control system according to claim 1, wherein the electroerosion controller sends contact sensing trigger to the NC kernel of the CNC controller, the NC kernel sending the contact sensing trigger signal to the PLC to stop the tool electrode.

6. The electroerosion control system according to claim 1, wherein the general CNC controller and the electroerosion controller respectively have a first general CNC mode and a second electroerosion mode.

7. A dual mode control system, comprising:

an electroerosion controller storing an electroerosion software; and a Computerized Numerical Controller (CNC) controller electrically communicating with the electroerosion controller, the CNC controller includes an Numerically-Controlled (NC) kernel and a Programmable Logic Control (PLC), the NC kernel stores a NC part program and the PLC stores a ladder program; the CNC controller including a first general CNC mode and a second electroerosion mode, in the first general CNC mode, the CNC controller controlling a general CNC machine to perform general CNC machining, in the second electroerosion mode, the electroerosion controller performing the electroerosion software and sending electroerosion instructions through the CNC controller to control the general CNC machine to perform electroerosion machining, wherein the CNC controller includes a Tool Retraction and Recovery (TRR) motion and the electroerosion controller sends a jump up/down signal according to a real-time status information of a working gap to the CNC controller to trigger the TRR motion, wherein a jump distance of a jump up/down action is written either in the NC part program or a parameters table of the NC kernel;

a power supply for energizing an adaptive tool electrode and a workpiece being machined in the second electroerosion mode; and the at least one sensor sensing the real-time status information of the working gap between the tool electrode and the workpiece, wherein the at least one sensor senses real-time voltage of the working gap;

wherein the electroerosion controller sends the jump up/down signal to the PLC of the CNC controller, the PLC transmitting the jump up/down signal to the NC kernel where the NC part program is stored.

8. The dual mode control system according to claim 7, wherein the power supply is controlled by the electroerosion controller.

9. The dual mode control system according to claim 7, wherein the power supply senses the real-time voltage of the working gap, and sends the real-time voltage to the electroerosion controller.

* * * * *